DEPTH AND DRAFT CONTROL FOR TRACTOR DRAWN IMPLEMENTS
Original Filed Feb. 25, 1952
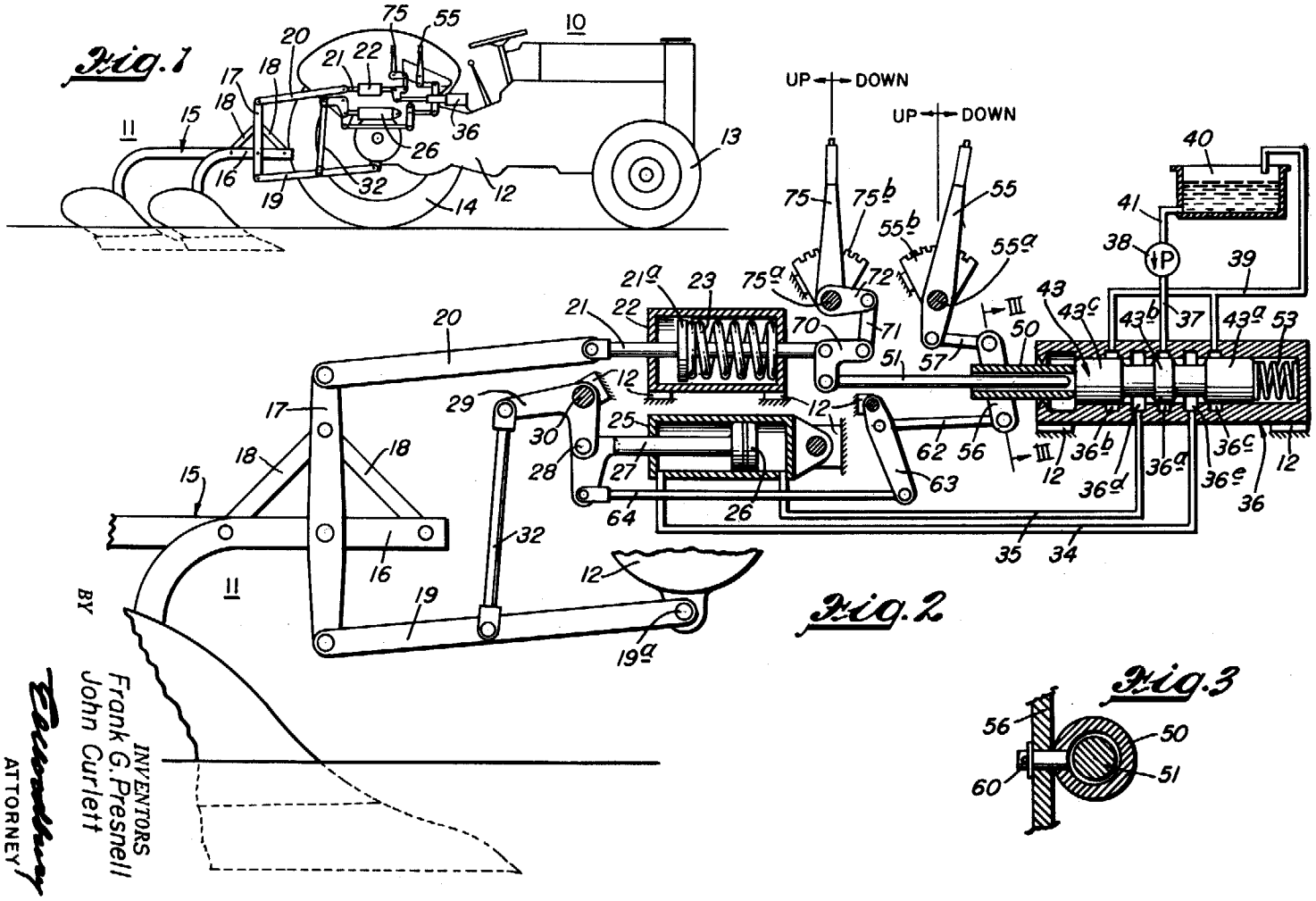
INVENTORS
Frank G. Presnell
John Curlett
BY
ATTORNEY United States Patent Office Re. 25,512
Reissued Jan. 14, 1964

25,512

DEPTH AND DRAFT CONTROL FOR TRACTOR DRAWN IMPLEMENTS

Frank G. Presnell, Hollywood, and John Curlett, Los Gatos, Calif., assignors, by mesne assignments, to Massey-Ferguson Services, N.V., Willemstad, Curacao, Netherlands Antilles, a corporation of Netherlands Original No. 2,964,113, dated Dec. 13, 1960, Ser. No. 562,879, Feb. 1, 1956, which is a continuation of abandoned application Ser. No. 273,184, Feb. 25, 1952. Application for reissue Dec. 10, 1962, Ser. No. 244,856
11 Claims. (Cl. 172—9)

Matter enclosed in heavy brackets [ ] appears in the original patent but forms no part of this reissue specification; matter printed in italics indicates the additions made by reissue.

The present application is a continuation of our copending application Serial No. 273,184, entitled "Combined Depth and Draft Control for Tractor Drawn Implements," filed February 25, 1952, and now abandoned.

This invention relates to methods of plowing, and to the depth control of ground working tools, and is more particularly concerned with hydraulic lift equipment for such purposes.

It is old to employ hydraulic equipment to provide power lift of tractor tools and to hold the tools in working position at a predetermined depth relative to the tractor, which provides constant depth on even terrain. However, on uneven terrain, such systems do not provide constant depth because when the front wheels of the tractor are in a depression, a tool on the rear end of the tractor is elevated with respect to the ground, and vice versa. To maintain more uniform depth on uneven terrain, constant draft systems have been resorted to which lower the tool (with respect to the tractor) when the draft decreases, and raise it when the draft increases. Unfortunately in this system, draft varies not only with the depth of the tool, but also with the nature of the soil, the system working soft soil deep, and hard soil shallow.

Attempts have been made to combine the two systems and obtain the advantages of both, but the result has been a compromise in which the advantage of either system alone has been greatly diminished along with its disadvantages.

An object of the present invention is to provide a system incorporating both draft and depth responsive control in such a way that inherent advantages of each are realized to a large extent.

Another object is to provide a system that is responsive solely to draft within a limited range of depth, but cannot exceed that depth.

Another object is to provide a depth control system that can be quickly set to provide either draft responsive control or depth responsive control, primary draft control and secondary depth control, or primary depth control and secondary draft control.

Other more specific objects and features of the invention will become apparent from the description to follow with reference to the drawing, in which:

FIGURE 1 is a side elevation of a tractor and plow assembly incorporating control equipment in accordance with the invention;

FIGURE 2 is a schematic view of a larger scale, showing the control equipment and the plow supporting structure; and FIGURE 3 is a cross section taken in the plane III—III of FIGURE 2.

Referring to FIGURE 1, there is shown a tractor 10 having attached thereto a plow 11. Thet ractor has the usual frame 12, front wheels 13, and rear wheels 14, only one of the latter being shown in FIGURE 1. The plow has a frame 15 shown as consisting of a beam 16 and an upright 17 rigidly attached thereto and reinforced by braces 18. The lower end of the upright 17 is connected to the frame 12 of the tractor by a draft link 19, and the upper end of the upright 17 is connected by a draft-responsive link 20 to a rod 21 extending through a spring housing 22 which is anchored to the tractor frame.

Referring to FIGURE 2, the rod 21 is constantly urged to the left by a helical compression spring 23 contained within the spring housing 22 and compressed between the right end of the latter and a disc 21a which is secured to the rod 21. When the draft of the plow 11 is light, the spring 23 maintains the disc 21a against the left end of the spring housing 22. However, an increase in draft tends to rotate the plow frame and the upright 17 clockwise about the pinned connection in the lower end of upright 17, thereby tending to compress the spring 23 and slide the rod 21 through the spring housing 22 to the right. It will be seen that the draft link 19, upright 17, draft-responsive link 20, rod 21, spring housing 22, and spring 23 constitute force transmitting mechanism adapted in the present instance to drag the plow through the soil; and that the rod 21 and draft-responsive link 20 thereof, provide movement proportional to the forces transmitted by the mechanism.

The vertical position of the plow 11 relative to the tractor is controlled by a hydraulic motor consisting of a cylinder 25 pivotally connected at its forward end to the tractor frame 12, and containing a piston 26 having a piston rod 27 extending through the left end of the cylinder and connected by a pivot pin 28 to one arm of a bell crank lever 29 which is fulcrumed by a pin 30 to the tractor frame, and has a second arm connected to the upper end of a draft control link 32, the lower end of which is pinned to the draft link 19. Leftward movement of the motor piston 26 raises the draft link 19, causing it to rotate clockwise about its point of pivotal attachment 19a to the tractor frame 12, thereby elevating the plow 11, and vice versa, rightward movement of the piston 26 lowers the plow 11 relative to the tractor.

Opposite ends of the motor cylinder 25 are connected by hydraulic lines 34 and 35 to a valve body 36 to which there is also connected a pressure line 37 leading from a pump 38, and an exhaust line 39 connected to a reservoir 40. The intake of the pump 38 is connected by a line 41 to the reservoir 40.

The valve body 36 defines a cylinder having annular lands defining an annular pressure chamber 36a, two annular exhaust chambers 36b and 36c, and two motor chambers 36d and 36e. The valve body 36 contains a movable piston element or valve slide 43 having lands 43a, 43b and 43c which cooperate with the chambers in the valve body to control flow of fluid between the pressure and exhaust chambers and the motor chambers, according to the longitudinal position of the element 43. In a neutral position of the element 43, as shown in FIGURE 2, the motor chambers 36d and 36e are blocked, thereby locking fluid in the motor cylinder 25 to lock the position of the plow 11 relative to the tractor frame. If the valve element 43 is moved to the right, it communicates the pressure chamber 36a with the motor chamber 36d to admit pressure fluid to the right end of the motor cylinder 25, and connects the motor chamber 36e to the exhaust chamber 36c to permit discharge of fluid from the left end of the motor cylinder, thereby causing leftward movement of the piston 26 to elevate the plow 11. On the other hand, leftward movement of the valve element 43 connects the pressure chamber 36a to the motor chamber 36e, and connects the motor chamber 36d to the exhaust chamber 36b, to move the motor piston 26 to the right, thereby lowering the plow 11.

The position of the movable valve element 43 is determined either by a sleeve 50 slideable in the left end of the valve body 36, or a rod 51 which is slideable within the sleeve 50, so that either one can bear against the left end of the valve element 43 and urge it to the right. The element 43 is constantly urged into contact with one or the other of either the sleeve 50 or the rod 51 by a helical compression spring 53. This arrangement provides a lost motion connection or one-way drive between the sleeve 50 and the valve element 43, and an independent lost motion connection or one-way drive between the rod 51 and the valve element 43. Either the sleeve 50 or the rod 51 can move the valve to the right, but neither will permit movement of the valve to the left beyond a position determined by the other element.

The position of the sleeve 50 is determined by the setting of a depth control handle 55 and the depth of the plow 11. Thus the sleeve 50 has fulcrumed thereon a lever 56, the upper end of which is connected by a link 57 to the lower end of the depth control handle 55, the latter being fulcrumed to the tractor frame by a pin 55a and having a conventional quadrant 55b whereby it can be selectively locked in any position of adjustment. The mid point of the lever 56 may be fulcrumed to the sleeve 50 by a pin 60 as shown in FIGURE 3. The lower end of the lever 56 is connected by a link 62 to an intermediate point on a lever 63, the upper end of which is fulcrumed to the tractor frame, and the lower end of which is connected by a link 64 to the piston rod 27.

It will be apparent from the foregoing description that movement of the depth control handle 55 (assuming that the rod 51 is not in position to engage the valve element 43) shifts the valve element 43 to admit the fluid to one end or the other of the motor cylinder 25, and move the motor piston 26 and the link 64. The movement imparted to the sleeve 50 by movement of the piston 26 in response to a previous movement of the sleeve 50 restores the valve element 43 to neutral position when the plow 11 has moved into a position corresponding to the setting of the depth control handle 55. Hence as long as the rod 51 does not take control of the valve element away from the sleeve 50, movement of the depth control handle 55 into any selected position moves the plow 11 to a corresponding depth with respect to the plow frame.

The left end of the rod 51 is connected to one arm of a bell crank lever 70 which is fulcrumed on the draft-responsive rod 21 and has a second arm connected by a link 71 to an arm 72 on a draft control handle 75 which, like the depth control handle 55, is fulcrumed by a pin 75a to the tractor frame, and has a quadrant 75b for retaining it in any position into which it is set.

Remembering that movement of the valve element 43 to the right produces elevation of the plow 11, it will be noted that any time the draft of the plow exceeds the value determined by the setting of the draft control handle 75, the spring 23 will be compressed permitting rightward movement of the rod 21 and the rod 51 to shift the valve element 43 to the right and thereby elevate the plow until the draft is reduced to a value sufficient to permit return of the valve element 43 to neutral position.

A counterclockwise movement of the draft control handle 75 moves the rod 51 rightward with respect to the rod 21 so that relatively slight movement of the rod 21 out of rest position (in which the disc 21a is against the left end of the spring housing 22) causes the valve element 43 to move to the right and raise the plow. On the other hand by rotating the draft control handle 75 clockwise the linkage consisting of the rod 21 and the rod 51 is shortened so that relatively high compression of the spring 23 is required before the rod 51 is engaged with and moves the valve element 43.

Regardless of the setting of the draft control handle 75, the depth of the plow with respect to the plane of the tractor frame cannot be increased above a predetermined value determined by the setting of the depth control handle 55. Assuming that the draft control portion is being used to normally control the depth of the plow, pin 51 would be in engagement with valve element 43 and the sleeve 50 woud be a slight distance out of engagement. Whenever, the tractor is driven from hard ground onto softer ground, the front wheels of the tractor sink into the softer ground to pivot the frame of the tractor about its rear wheels and thereby raise the attached plow relative to the ground. Should this occur, the draft control mechanism causes the plow to be moved deeper relative to the frame of the tractor; and when the rear wheels of the tractor moves onto the softer ground, the plow becomes buried and stalls the tractor. When the position control mechanism of applicants' invention is set for a plow depth relative to the tractor frame which is slightly deeper than the draft control setting, the above described burying of the plow is prevented. When the tractor frame pivots to raise the plow, pin 51 moves away from the valve element 43 permitting the valve element 43 to follow until such time as it is engaged by the sleeve 50. Thereafter, the sleeve 50 takes over to force valve element 43 to its neutral position during a slight further lowering movement of the plow. This occurs at a plow depth relative to the ground at a position well above that called for by the draft control portion so that the plow thereafter will not sink too deeply when the rear wheels of the tractor move onto the softer ground.

Likewise, regardless of the setting of the depth control handle 55, the depth for which it is set will not be maintained if the draft exceeds a value determined by the setting of the draft control handle 75, because then the rod 51 takes control of the valve element 43 away from the sleeve 50.

It is to be understood, however, that the range of adjustment permitted by the draft control handle 75 or by the depth control handle 55 may be such that for all practical purposes it exercises no control in extreme clockwise or "down" position of adjustment.

It will be observed that for any setting of the draft control handle 75, the rod 51 moves through a stroke approximately equal to that of the draft responsive rod 21, and adjustment of the handle 75 simply changes the mean position of the rod 51 relative to the valve element 43. Likewise, adjustment of the depth control handle simply changes the mean position of the sleeve 50. The bell crank lever 70 and the lever 56 constitute equivalent mechanisms for altering the means position of the rod 51 and the sleeve 50.

As shown, the motor 25 and the valve control therefor is such as to produce positive action in both directions. However, it is to be understood that this is not essential in the utilization of the invention. There are in existence many depth control hydraulic systems in which pressure fluid is applied to the piston only in direction to raise the plow, downward movement of the plow being produced by its own weight and the reaction of the soil as it passes therethrough. Thus the system as shown can be converted to a single action system by eliminating the hydraulic line 34, venting the left end of the motor cylinder 25, and eliminating the valve chambers 36e and 36c.

Although for the purpose of explaining the invention a particular embodiment thereof has been shown and described, obvious modifications will occur to persons skilled in the art and we do not desire to be limited to the exact details shown and described.

We claim:

1. In controls for farm implements and the like having force transmitting mechanism adapted to be raised and lowered and having a portion thereof adapted to provide movement which is a function of the forces transmitted by the mechanism, a fluid pressure motor for raising said mechanism, a fluid control valve having a movable member for controlling the operation of said valve, said control valve being constructed and arranged such that movement of said movable member from a neutral position to an actuating position permits fluid pressure to be conducted to said fluid pressure motor in a manner raising said mechanism, first means including a lost motion connection for moving said movable member from said neutral position to said actuating position in response to said movement of said portion of said force transmitting mechanism resulting from an increase in the forces transmitted, said first means being adjustable to provide various degrees of lost motion, second means including a lost motion connection independent of said first means for restoring said movable member to its neutral position in response to a maximum predetermined downward movement of said mechanism, said second means being adjustable to provide various degrees of lost motion, the adjustment and operative movement of one of said means in no way affecting the adjustment and operative movement of the other of said means, and means biasing said movable member from said actuating position toward said neutral position.

2. In controls for farm implements and the like having force transmitting mechanism adapted to be raised and lowered and having a portion thereof adapted to provide movement which is a function of the forces transmitted by the mechanism, a fluid pressure motor for raising said mechanism, a fluid control valve having a movable member for controlling the operation of said valve, said control valve being constructed and arranged such that movement of said movable member in one direction from a normal position to a second position permits fluid pressure to be conducted to said fluid pressure motor in a manner raising said mechanism, first means having an abutment surface for moving said movable member in said one direction in response to movement of said portion of said force transmitting member resulting from an increase in the forces transmitted, said first means being adjustable to provide various degrees of clearance between its abutment surface and said normal position of said movable member, second means having an abutment surface for abutting and restoring said movable member to its normal position in response to downward movement of said mechanism, said second means being adjustable to provide various degrees of clearance between its abutment surface and said normal position of said movable member, the adjustment and operative movement of one of said means in no way affecting the adjustment and operative movement of the other of said means, and means biasing said movable member in a direction toward said abutment surfaces.

3. In controls for farm implements and the like having force transmitting mechanism adapted to be raised and lowered and having a portion thereof adapted to provide movement which is a function of the forces transmitted by the mechanism; a double acting fluid pressure motor for raising and lowering said mechanism; a fluid control valve having a movable member for controlling the operation of said valve; said movable member having a first position in which pressure fluid is conducted to said fluid pressure motor in a manner enabling said mechanism to be moved downwardly, a second position in which pressure fluid is conducted to said fluid pressure motor in a manner causing said mechanism to be moved upwardly, and an intermediate position in which fluid flow to and from said fluid pressure motor is prevented; first means including a lost motion connection for moving said movable member toward second position in response to movement of said portion of said force transmitting mechanism resulting from an increase in the forces transmitted, said first means being adjustable to provide various degrees of lost motion; second means including a lost motion connection for restoring said movable member to its intermediate position in response to downward movement of said mechanism from a raised position thereof, said second means being adjustable to provide various degrees of lost motion, the adjustment and operative movement of one of said means in no way affecting the adjustment and operative movement of the other of said means; and means biasing said movable member in a direction toward said first position.

4. In controls for farm implements and the like having force transmitting mechanism adapted to be raised and lowered and having a portion thereof adapted to provide movement which is a function of the forces transmitted by the mechanism; a double acting fluid pressure motor for raising and lowering said mechanism; a fluid control valve having a movable member for controlling the operation of said valve; said movable member having a first position in which pressure fluid is conducted to said fluid pressure motor in a manner causing said mechanism to be moved downwardly, a second position in which pressure fluid is conducted to said fluid pressure motor in a manner causing said mechanism to be moved upwardly, and an intermediate position in which fluid flow to and from said fluid pressure motor is prevented; first means having an abutment surface for moving said movable member toward its second position in response to movement of said portion of said force transmitting mechanism resulting from an increase in the forces transmitted, said first means being adjustable to provide various degrees of clearance between its abutment surface and said intermediate position of said movable member; second means having an abutment surface for abutting and restoring said movable member to its intermediate position in response to downward movement of said mechanism; said second means being adjustable to provide various degrees of clearance between its abutment surface and said intermediate position of said movable member, the adjustment and operative movement of one of said means in no way affecting the adjustment and operative movement of the other of said means; and means biasing said movable member in a direction toward said abutment surfaces.

5. In controls for farm implements and the like having force transmitting mechanism adapted to be raised and lowered and having a portion thereof adapted to provide movement which is a function of the forces transmitted by the mechanism; a double acting fluid pressure motor for raising and lowering said mechanism; a slide valve having a slide therein for controlling said fluid pressure motor; said slide having a first position in which pressure fluid is conducted to said fluid pressure motor in a manner causing said mechanism to be moved downwardly, a second position in which pressure fluid is conducted to said fluid pressure motor in a manner causing said mechanism to be moved upwardly, and an intermediate position in which fluid flow to and from said fluid pressure motor is prevented; first means having an abutment surface for moving said slide toward its second position in response to movement of said portion of said force transmitting mechanism resulting from an increase in the forces transmitted, said first means being adjustable to provide various degrees of clearance between its abutment surface and said intermediate position of said slide; second means having an abutment surface for abutting and restoring said slide to its intermediate position in response to downward movement of said mechanism; said second means being adjustable to provide various degrees of clearance between its abutment surface and said intermediate position of said slide; and means biasing said slide in a direction toward said abutment surfaces.

6. In controls for farm implements and the like having force transmitting mechanism adapted to be raised and lowered and having a portion thereof adapted to provide movement which is a function of the forces transmitted by the mechanism; a double acting fluid pressure motor for raising and lowering said mechanism; a slide valve having a slide therein for controlling said fluid pressure motor; first and second abutment members positioned at one end of said slide for abutting and moving said slide in one direction; said slide being movable from a first end position adjacent said first and second abutment members and in which pressure fluid is conducted to said fluid pressure motor in a manner causing said mechanism to be moved downwardly to an opposite end position in which pressure fluid is conducted to said fluid pressure motor in a manner causing said mechanism to be moved upwardly, said slide also having an intermediate position in which fluid flow to and from said fluid pressure motor is prevented; first means connecting said portion of said mechanism and said first abutment member for moving said first abutment member toward said slide in response to movement of said portion of said force transmitting mechanism resulting from an increase in the forces transmitted; said first means being adjustable to provide various degrees of clearance between said first abutment member and the intermediate position of said slide; second means connecting said force transmitting mechanism with said second abutment member for moving said second abutment member toward said slide in response to downward movement of said mechanism; said second means being adjustable to provide various degrees of clearance between said second abutment member and the intermediate position of said slide; and means biasing said slide in a direction toward said abutment members.

[7. In controls for farm implements and the like having force transmitting mechanism adapted to be raised and lowered and having a portion thereof constructed and arranged to provide movement which is a function of the force transmitted by the mechanism, a fluid pressure motor for raising said mechanism, a fluid control valve for controlling the operation of said fluid pressure motor, said valve having a control member movable from a normal position wherein no flow is conducted to said fluid pressure motor to a second position in which fluid pressure is conducted to said fluid pressure motor in a manner raising said mechanism, first means operatively connecting said portion of said mechanism and said valve control member for moving said control member from said normal position to said second position in response to movement of said portion resulting from an increase in the forces transmitted, said first means being adjustable to provide a series of settings which differ from each other in the amount of transmitted forces required to move said control member into its second position, second means operatively connected between said force transmitting mechanism and said valve control member for restoring said control member from said second position to said normal position in response to lowering of said mechanism, said second means being adjustable independently of said first means to provide a series of settings which differ from each other in the elevation of said mechanism at which said control member is moved into its second position, and said first and second means being constructed and arranged such that neither the setting nor operative movement of one of said means will change the setting of the other of said means.]

[8. In controls for draft mechanism adaptable for supporting plows and the like at various elevations and having a portion thereof constructed and arranged to provide movement which is a function of the draft transmitted by the mechanism, a fluid pressure motor for raising said mechanism, a fluid control valve for controlling the operation of said fluid pressure motor said valve having a control member movable from a normal position wherein no flow is conducted to said fluid pressure motor to a second position in which fluid pressure is conducted to said fluid pressure motor in a manner raising said mechanism, first means operatively connecting said portion of said draft mechanism and said valve control member for moving said control member from said normal position to said second position in response to movement of said portion resulting from an increase in draft, said first means being readily adjustable to provide a series of settings which differ from each other in the amount of draft required to move said control member into its second position, second means operatively connected between said draft mechanism and said valve control member for restoring said control member from said second position to said normal position in response to lowering of said draft mechanism, said second means being readily adjustable independently of said first means to provide a series of settings which differ from each other in the elevation of said draft mechanism at which said control member is disposed in its normal position, the adjustment and operative movement of one of said means in no way affecting the adjustment and operative movement of the other of said means, and whereby any combination of depth and/or draft control can be utilized including a combination wherein the depth of the plow is normally controlled by said first means but in which the plow is prevented from going beyond a predetermined depth of said second means.]

[9. In controls for draft mechanisms adapted for supporting plow and the like at various elevations and having a portion thereof constructed and arranged to provide movement which is a function of the draft transmitted by the mechanism, a motor for raising said mechanism, a control mechanism for controlling the operation of said motor, said control mechanism having a control member movable from a normal position wherein the motor is actuated in a manner raising said draft mechanism, first means operatively connecting said portion of said draft mechanism and said control member for moving said control member from said normal position to said second position in response to movement of said portion resulting from an increase in draft, said first means being adjustable to provide a series of settings which differ from each other in the amount of draft required to move said control member into its second position, second means operatively connected between said draft mechanism and said control member for restoring said control member from said second position to said normal position in response to lowering of said draft mechanism, said second means being adjustable to provide a series of settings which differ from each other in the elevation of said draft mechanism at which said control member is disposed at its normal position, the adjustment and operative movement of one of said means in no way affecting the adjustment and operative movement of the other of said means, and whereby a combination of depth and/or draft control can be utilized including a combination wherein the plow is prevented from going beyond a predetermined depth by said second means and is temporarily raised from said predetermined depth by operation of said first means to relieve excessive draft as it exists under transient state condition.]

[10. A control for farm implements comprising two control members each accessible to the operator and separately movable to effect position and draft settings for the farm implement, a valve element, first valve-operating means movable into and out of operative mechanical one-way drive connection with said valve element to effect actuation thereof, a draft responsive member having a force transmitting connection with said implement to sense the amount of draft load developed by said implement and providing a force output communicating with said first valve-operating means, means for adjusting said first valve-operating means through one of said control members whereby output of said load responsive member is made effective through said first valve-operating means for operating said valve at a predetermined draft, a power operated motor having operative connections with said valve to be actuated thereby and operative connections with the implement to control its depth in accordance with the preselected draft setting of said one control member, valve-restoring means effecting valve movement in a direction which restores said valve to its neutral position, a second valve-operating means movable separately from said first valve-operating means by the other of said control members to establish or break operative mechanical one way drive connection with said valve and provide opening thereof to actuate said motor and thereby effect raising of said implement to a higher level defined independently of the level provided by said first valve-operating means and its control member, and restoring means for said second valve-operating means which operates jointly with said first restoring means in moving said valve to its neutral position responsively to raising of said implement to a position higher than provided by said first valve operating means while maintaining the draft setting of its control member.]

[11. A control for farm implements comprising two control members each accessible to the operator and each operable independently to effect settings for draft and position control of the implement, a draft responsive member having a force transmitting connection with said implement to be responsive to at least a portion of its draft force, a valve element, first means operatively connected to said draft responsive member for movement thereby and having an operative one-way drive connection with said valve element for operating said valve element, adjusting means actuated by said draft control member for determining the point at which said load responsive member is effective to actuate said valve at the selected upper limit of draft force, a power operated fluid pressure motor having fluid connections with said valve and actuated thereby to raise said implement and decrease its draft force, a second valve operating means movable independently of said first valve operating means by said position control member and having an operative one-way drive connection with said valve for operation thereof, said valve thereafter effecting actuation of said fluid pressure motor to provide raising of said implement above the level provided by the setting of said draft control member, and means responsive to raising movement of said implement and acting through said second valve operating means to effect restoring of said valve to its neutral position at a level of said implement provided by the setting of said position regulating means and which is higher than provided by the setting of said draft control member.]

12. A control system in a tractor having a hitch linkage for drawing farm implements, comprising a fluid pressure motor for raising said implement, a valve for controlling said motor, means for controlling implement position above and below the ground, draft control means, both said means operatively connected to said valve which is movable in one direction for raising said hitch linkage and in the opposite direction to provide lowering thereof, said draft control means including a motion-transmitting mechanism having a driver-actuated draft selector movable into a draft selecting position and a draft-responsive means automatically movable in response to changes in draft, said means for controlling implement position having a driver-actuated position selector movable independently of said [drive-] *driver*-actuated draft selector into a selected position, a restoring device movable by and in unison with said hitch linkage, and a second motion transmitting means which is under the joint control of said position selector and said restoring device, said first and second motion transmitting means each having one-way valve operating connections with said valve to effect its actuation in a hitch-linkage-raising direction, *the setting and operative movement of one motion transmitting means in no way affecting the setting and operative movement of the other motion transmitting means.*

*13. A control system in a tractor having a hitch linkage for drawing farm implements, comprising a fluid pressure motor for raising said implement, a valve for controlling said motor, a first valve actuating mechanism including a part movable in response to changes in position of the hitch linkage, a part adjustable manually through a range of settings and a member differentially transmitting the motion of said two parts, a second valve actuating mechanism including a second part movable in response to changes in an operating condition at the implement, a second part adjustable manually through a range of settings and a second member differentially transmitting the motion of said two second parts; each of said members being arranged for operation of the valve independently of the other and with precedence over the other in one direction of valve movement.*

*14. A control system in a tractor having a hitch linkage for drawing farm implements, comprising a fluid pressure motor for raising said implement, a valve for controlling said motor, a first valve actuating mechanism including a part movable in response to changes in position of the hitch linkage, a part adjustable manually through a range of settings and a member differentially transmitting the motion of said two parts, a second valve actuating mechanism including a second part movable in response to changes in a force reaction on said hitch linkage, a second part adjustable manually through a range of settings and a second member differentially transmitting the motion of said two second parts; each of said members being arranged for operation of the valve independently of the other and with precedence over the other in one direction of valve movement.*

*15. A control for farm implements comprising two control members each accessible to the operator and separately movable to effect mutually independent position and draft settings for the farm implement, a valve having neutral and lift positions, first valve-operating means movable into and out of operative mechanical one-way drive connection with said valve to effect actuation of the valve to lift position, a draft responsive member having a force transmitting connection with said implement to sense the amount of draft load developed by said implement and providing a force output communicating with said first valve-operating means, means for adjusting said first valve-operating means through one of said control members whereby output of said draft responsive member is made effective through said first valve-operating means for operating said valve to lift position at a predetermined increase of draft, a power operated motor having operative connections with said valve to be actuated thereby and operative connections with the implement to control its depth in accordance with the preselected draft setting of said one control member, valve-restoring means effecting valve movement in a direction which restores said valve to its neutral position, a second valve-operating means movable separately from said first valve-operating means by the other of said control members to establish or break operative mechanical one-way drive connection with said valve to actuate said valve to lift position and thereby effect raising of said implement to a higher level defined independently of the level provided by said first valve-operating means and its control member, and restoring means for said second valve-operating means which operates jointly with said first restoring means in moving said valve to its neutral position responsively to raising of said implement to a position determined solely by the setting of its control member and higher than provided by said first valve-operating means while maintaining the draft setting of its control member.*

*16. A control for farm implements comprising two control members each accessible to the operator and each adjustable to effect mutually independent settings for draft and position control of the implement, a draft responsive member having a force transmitting connection with said implement to be responsive to at least a portion of its draft force, a valve, first means operatively connected to said draft responsive member for movement thereby and having an operative one-way drive connection with said valve for operating said valve, adjusting means actuated by said draft control member for determining the point at which said draft responsive member is effective to operate said valve at the selected upper limit of draft force, a power operated fluid pressure motor having fluid connection with*

*said valve and actuated thereby to raise said implement and decrease its draft force, a second valve-operating means movable independently of said first valve-operating means by said position control member and having an operative one-way drive connection with said valve for operation thereof, said valve thereafter effecting actuation of said fluid pressure motor to provide raising of said implement above the level provided by the setting of said draft control member, and means responsive to raising movement of said implement and acting through said second valve-operating means to effect restoring of said valve to its neutral position at a level of said implement provided by the setting of said position control member and which is higher than provided by the setting of said draft control member, the adjustment of each control member and the operative movement of its associated valve-operating means in no way affecting the adjustment of the other member and the operative movement of the other valve operating means.*

References Cited in the file of this patent or the original patent

UNITED STATES PATENTS

| | | |
|---|---|---|
| 2,629,306 | Rusconi | Feb. 24, 1953 |
| 2,631,514 | Roeder | Mar. 17, 1953 |
| 2,631,515 | McRae | Mar. 17, 1953 |
| 2,715,863 | Bunting | Aug. 23, 1955 |
| 2,722,873 | Garmager | Nov. 8, 1955 |
| 2,722,874 | Bopf | Nov. 8, 1955 |

FOREIGN PATENTS

| | | |
|---|---|---|
| 541,436 | Great Britain | Nov. 26, 1941 |